US012103301B2

(12) United States Patent
Snir

(10) Patent No.: US 12,103,301 B2
(45) Date of Patent: *Oct. 1, 2024

(54) AUTOMATIC HOLD-DOWN PALLET FOR TEXTILE PRINTING

(71) Applicant: Kornit Digital Ltd., Rosh HaAyin (IL)

(72) Inventor: Ohad Snir, Kiryat-Ono (IL)

(73) Assignee: Kornit Digital Ltd., Rosh HaAyin (IL)

( * ) Notice: Subject to any disclaimer, the term of this patent is extended or adjusted under 35 U.S.C. 154(b) by 303 days.

This patent is subject to a terminal disclaimer.

(21) Appl. No.: 17/331,746

(22) Filed: May 27, 2021

(65) Prior Publication Data

US 2021/0283930 A1 Sep. 16, 2021

Related U.S. Application Data

(63) Continuation of application No. 16/923,221, filed on Jul. 8, 2020, now Pat. No. 11,020,991, which is a continuation of application No. 15/749,515, filed as application No. PCT/IL2016/050842 on Aug. 2, 2016, now Pat. No. 10,744,799.

(60) Provisional application No. 62/200,693, filed on Aug. 4, 2015.

(51) Int. Cl.

*B41F 17/38* (2006.01)
*B41F 15/22* (2006.01)
*B41J 3/407* (2006.01)
*B41J 11/06* (2006.01)

(52) U.S. Cl.

CPC ............... *B41J 11/06* (2013.01); *B41F 15/22* (2013.01); *B41J 3/4078* (2013.01)

(58) Field of Classification Search

None

See application file for complete search history.

(56) References Cited

U.S. PATENT DOCUMENTS

| | | | |
|---|---|---|---|
| 315,775 | A | 4/1885 | Hall |
| 4,204,735 | A | 5/1980 | Opravil |
| 5,022,320 | A | 6/1991 | Szarka |
| 5,188,034 | A | 2/1993 | Iaccino et al. |

(Continued)

FOREIGN PATENT DOCUMENTS

| | | |
|---|---|---|
| CN | 101925460 | 12/2010 |
| CN | 102619079 | 8/2012 |

(Continued)

OTHER PUBLICATIONS

Notification of Office Action and Search Report Dated Oct. 26, 2021 From the State Intellectual Property Office of the People's Republic of China Re. Application No. 202011059228.X. (8 Pages).

(Continued)

*Primary Examiner* — Leslie J Evanisko

(57) ABSTRACT

A hold-down pallet for a textile printer, the pallet comprising a central board and flaps, the flaps moving between an open position to allow placing of a garment and a closed position to hold a garment firmly on the board for printing, the pallet travelling between a garment setting position and a printing area and comprising an engagement mechanism which engages the pallet as it enters the garment setting position. Engagement opens the flaps so that the flaps are in the open position in the garment setting area, the pallet disengaging to close the flaps as it heads for the printing area.

5 Claims, 9 Drawing Sheets

(56) References Cited

U.S. PATENT DOCUMENTS

| | | | |
|---|---|---|---|
| 5,199,353 A | 4/1993 | Szyszko | |
| 5,247,885 A | 9/1993 | Iaccino et al. | |
| 5,327,827 A | 7/1994 | Richardson | |
| 5,583,611 A | 12/1996 | Rutishauser | |
| 5,765,476 A | 6/1998 | McKeever | |
| 5,913,263 A | 6/1999 | Hruska | |
| 5,970,896 A | 10/1999 | Zinssmeister et al. | |
| 6,044,759 A | 4/2000 | Bill | |
| 6,640,714 B1 | 11/2003 | Papa | |
| 6,817,288 B2 | 11/2004 | Flatt | |
| 6,908,190 B2 | 6/2005 | Iwatsuki et al. | |
| 7,980,177 B2 | 7/2011 | Styles et al. | |
| 8,485,094 B2 | 7/2013 | Anglada et al. | |
| 9,028,160 B2 | 5/2015 | Garcia et al. | |
| 9,073,369 B2 | 7/2015 | Yanagishita | |
| 10,744,799 B2 * | 8/2020 | Snir | B41J 3/4078 |
| 11,020,991 B2 * | 6/2021 | Snir | B41J 11/06 |
| 2003/0197750 A1 | 10/2003 | Iwatsuki et al. | |
| 2003/0197772 A1 | 10/2003 | Iwatsuki et al. | |
| 2008/0163775 A1 | 7/2008 | Livingston | |
| 2013/0076814 A1 | 3/2013 | Kanaya et al. | |
| 2013/0336702 A1 | 12/2013 | Yanagshta | |
| 2013/0340640 A1 | 12/2013 | Yanagishita | |
| 2015/0321463 A1 | 11/2015 | Robinson | |
| 2017/0320339 A1 * | 11/2017 | Matsumoto | B41J 11/06 |
| 2018/0222220 A1 | 8/2018 | Snir | |
| 2020/0338913 A1 | 10/2020 | Snir | |

FOREIGN PATENT DOCUMENTS

| | | |
|---|---|---|
| CN | 101454499 | 9/2021 |
| EP | 1185419 | 3/2002 |
| GB | 2005189 | 4/1979 |
| JP | 2013-221229 | 10/2013 |
| WO | WO 00/73071 | 12/2000 |
| WO | WO 2017/021960 | 2/2017 |

OTHER PUBLICATIONS

Translation Dated Nov. 16, 2021 of Notification of Office Action and Search Report Dated Oct. 26, 2021 From the State Intellectual Property Office of the People's Republic of China Re. Application No. 202011059228.X. (8 Pages).

Communication Pursuant to Article 94(3) EPC Dated Dec. 2, 2020 From the European Patent Office Re. Application No. 16832424.2. ( 6 Pages).

Communication Pursuant to Article 94(3) EPC Dated Apr. 22, 2020 From the European Patent Office Re. Application No. 16832424.2. (4 Pages).

European Search Report and the European Search Opinion Dated Apr. 26, 2021 From the European Patent Office Re. Application No. 20208777.1. (12 Pages).

Ex-Partc Quaylc Official Action Datcd Nov. 17, 2020 from the US Patent and Tradcmark Officc Rc. U.S. Appl. No. 16/923,221. (9 pagcs).

International Preliminary Report on Patentability Dated Feb. 15, 2018 From the International Preliminary Examining Authority Re. Application No. PCT/IL2016/050842. (5 Pages).

International Search Report and the Written Opinion Dated Nov. 3, 2016 From the International Searching Authority Re. Application No. PCT/IL2016/050842.

Notice of Allowance Dated Feb. 3, 2021 From the US Patent and Trademark Office Re. U.S. Appl. No. 16/923,221. (6 Pages).

Notice of Allowance Dated Apr. 21, 2020 from the US Patent and Trademark Office Re. U.S. Appl. No. 15/749,515. (7 pages).

Notification of Office Action and Search Report Dated Sep. 25, 2019 From the State Intellectual Property Office of the People's Republic of China Re. Application No. 201680045208.2. (7 Pages).

Official Action Dated Aug. 22, 2019 From the US Patent and Trademark Office Re. U.S. Appl. No. 15/1749,515. (11 pages).

Official Action Datcd Jan. 30, 2020 From the US Patcnt and Tradcmark Officc Rc. U.S. Appl. No. 15/749,515. (9 pages).

Official Action Dated Aug. 7, 2020 from the US Patent and Trademark Office Re. U.S. Appl. No. 16/923,221. (10 pages).

Supplementary European Search Report and the European Search Opinion Dated Feb. 19, 2019 From the European Patent Office Re. Application No. 16832424.2. (10 Pages).

Translation Dated Oct. 9, 2019 of Notification of Office Action Dated Sep. 25, 2019 From the State Intellectual Property Office of the People's Republic of China Re. Application No. 201680045208. 2. (3 Pages).

Notification of Office Action and Search Report Dated May 10, 2022 From the State Intellectual Property Office of the People's Republic of China Re. Application No. 202011059228.X. (3 Pages).

Translation Dated May 24, 2022 of Notification of Office Action and Search Report Dated May 10, 2022 From the State Intellectual Property Office of the People's Republic of China Re. Application No. 202011059228.X. (1 Page).

* cited by examiner

AUTOMATIC HOLD-DOWN PALLET FOR TEXTILE PRINTING

RELATED APPLICATIONS

This application is a continuation of U.S. patent application Ser. No. 16/923,221 filed on Jul. 8, 2020, which is a continuation of U.S. patent application Ser. No. 15/749,515 filed on Feb. 1, 2018, now U.S. Pat. No. 10,744,799, which is a National Phase of PCT Patent Application No. PCT/IL2016/050842 having International Filing Date of Aug. 2, 2016, which claims the benefit of priority under 35 USC § 119(e) of U.S. Provisional Patent Application No. 62/200,693 filed on Aug. 4, 2015. The contents of the above applications are all incorporated by reference as if fully set forth herein in their entirety.

FIELD AND BACKGROUND OF THE INVENTION

The present invention, in some embodiments thereof, relates to an automatic hold-down pallet for loading of garments and other textiles for printing in a textile printing machine.

Textile printing is widely practiced, and applied to everything from rolls of fabric to already made garments. Pallets are generally used for loading ready made garments, and the requirements for a pallet are that the garment may be loaded quickly and held taut so as to allow the printing to be effective. The pallet carries the garment into the printing area and holds it firmly for printing.

The printing itself most commonly involves screen printing or ink jet printing techniques, as well as pre-processing to prepare the textile surfaces for effective printing and post processing which is typically to cure the ink.

FIG. 1 shows a prior art printing machine with a pallet for loading. In general, a pallet consists of a board, which may be square or rectangular, or may be specifically shaped for the garment, and a frame that surrounds the board. The frame is opened, the garment is inserted tightly and the frame is closed. Following closing of the frame, the pallet enters the printing area.

The frame may surround the entire board and the open frame allows for easy placement of the garment on the board. When closed the sides of the frame contact the board and if a garment is present then the sides of the frame press the garment directly against the board to hold the garment firmly in place. As long as the garment is correctly placed, the lowering of the frame may allow the frame to press on the edges of the board and hold the garment firmly for printing, thus providing the operator with a simple action for mounting the garment which can be performed quickly.

Often two pallets are provided side by side, so that the operator can load one pallet while the other pallet is being printed, thus making the operation more efficient, but also being more demanding on the operator.

SUMMARY OF THE INVENTION

As mentioned, the machine operator is under time pressure to open the frame, unload the previous garment, load the next garment and close the frame. Occasionally the frame is not closed, or not fully closed, before the pallet advances to the printing machine. Thus the frame collides with the structure of the printing machine, causing damage, which needs to be repaired and leads to downtime of the machine. In addition, closing of the frame can nudge the garment, causing folds and the like to appear and leading to ineffective printing.

The present embodiments thus provide a mechanical construction which may firstly ensure that no such collision can occur, secondly, may relieve the operator of the need to close the frame after placing the garment, and thirdly may avoid nudging the garment after placing on the board, thus reducing the overall pressure on the operator.

According to an aspect of some embodiments of the present invention there is provided a hold-down pallet for a textile printer, the pallet comprising a central board and flaps, the flaps able to alternate between an open position to allow placing of a garment and a closed position to hold a garment firmly on the board for printing, the pallet travelling between a garment setting position and a printing area and comprising a closing mechanism configured to place the flaps in the closed position prior to entering the printing area.

In an embodiment, said closing mechanism is configured to place the flaps in the open position when entering the garment setting position.

In an embodiment, said closing mechanism comprises an engagement device for engaging a lever of said pallet, the lever acting on said flaps to move said flaps between said open position and said closed position upon engagement and upon disengagement.

In an embodiment, said flaps comprises at least three flaps on at least three sides of said board, each flap being connected to open upon engagement with said engagement device and to close upon disengagement with said engagement device.

In an embodiment, a fourth side of said board is left open.

In an embodiment, said flaps close into said closed position by pivoting towards said board.

In an embodiment, said flaps fall short of said board in said closed position, leaving finite gaps on respective sides between a closed flap inner end and said board.

According to a second aspect of the present invention there is provided a hold-down pallet for a garment printer, the pallet comprising a board and flaps, the flaps forming elements on at least three sides of the board to hold garment edges taut against the board, the flaps mechanically connected to open and close together.

In an embodiment, the flaps are mechanically connected to open and close according to a current position of the pallet relative to printing areas of said printer and a garment setting location.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to an automatic hold-down pallet for loading of garments and other textiles for printing in a textile printing machine.

The pallet is provided with hold-down flaps but the flaps are provided with a position control, typically a mechanical position control, for example a lever mechanism, to automatically lower the flaps as the pallet approaches the printing area. The same mechanism may raise the flaps as the pallet exits the printing area.

The flaps may form a one-part multiple-sided hold down frame, or alternatively, each side of the board, or at least three sides of the board, may have separately operated hold-down flaps. The hold-down flaps may be operated by the same mechanical fail-safe mechanism.

The flaps may pivot between open and closed positions. In the closed positions the inner extents of the flaps may fall just short of the board, leaving a gap between the flap and the board in which the garment fabric is placed. As the flaps close they automatically pull tightly on the garment fabric to ensure the fabric is taut for effective printing.

Figure 1:
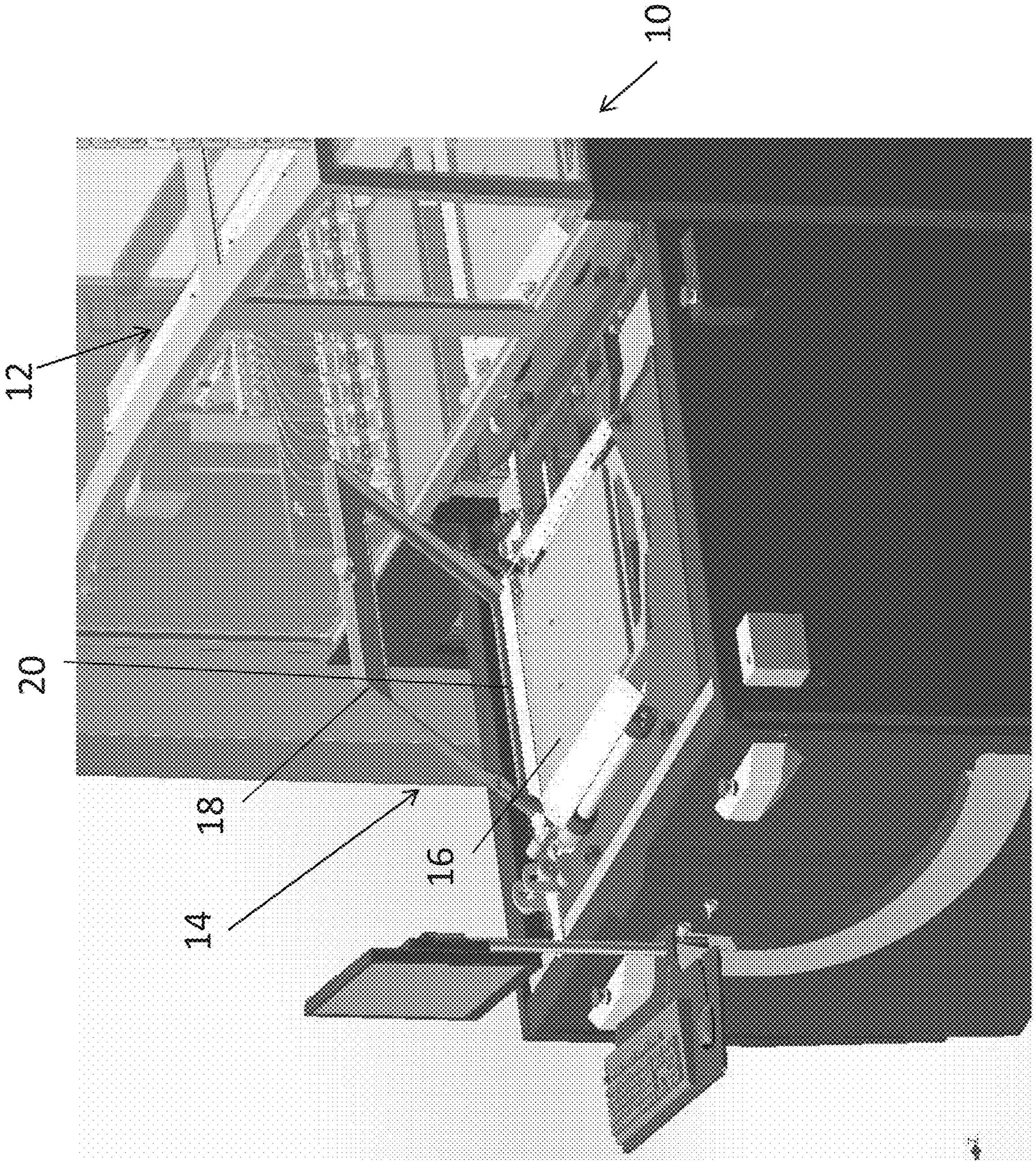
FIG. 1 (Prior Art)
FIG. 1 is a schematic drawing of a prior art garment printing machine with a pallet.

For purposes of better understanding some embodiments of the present invention, reference is first made to the construction and operation of a prior art pallet and garment printing machine as illustrated in FIG. 1. As shown in FIG. 1, printing machine 10 includes printing area 12 and garment setting area 14. Pallet 16 is currently located in the garment setting area 14 and the operator places a garment on the pallet 16 and then closes frame 18. The sides of frame 18 fit above the board and press downward to hold the garment fabric against the board. When ready the pallet passes from the setting area 14 to the printing area 12. The frame encloses all four sides of the pallet but one of the sides 20 is hinged to the frame. Thus the garment is arranged on the pallet under the frame but is in fact over the hinged side 20. On closure of the frame the garment is held to the frame on three sides but may be dislodged on the fourth side as the frame is closed. Thus the garment is not taut as needed for printing. Furthermore, if the garment was not already tight before the frame is closed, the closing of the frame will not make the garment any tighter.

Furthermore, if the operator forgets to close the frame 18 before printing then the frame is liable to collide with the frame of the printing machine 10, which may cause damage and lead to down time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
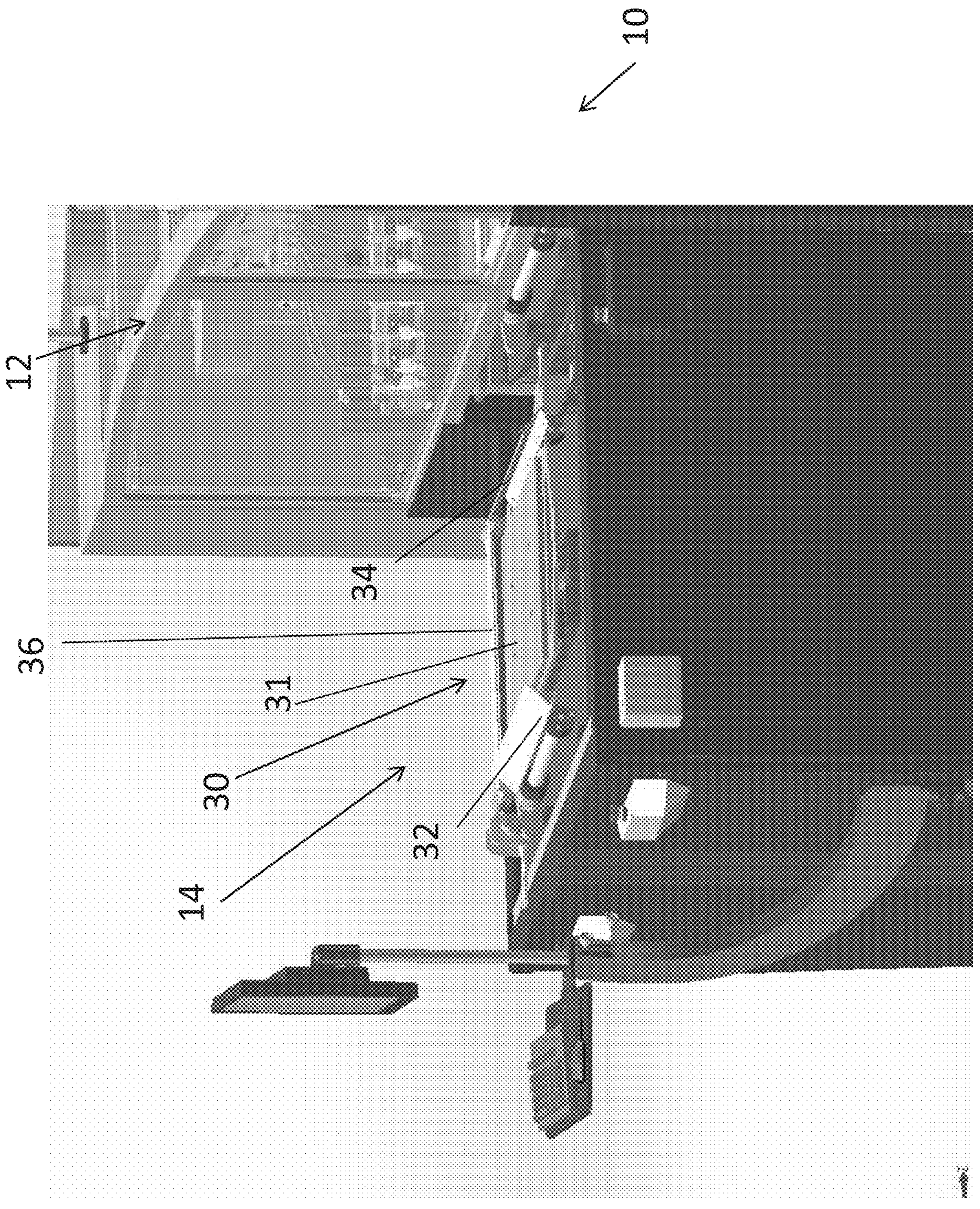
FIG. 2 is a simplified schematic drawing of a garment printing machine with a pallet according to an embodiment of the present invention.

Reference is now made to FIG. 2, which illustrates a similar textile machine 30 in which pallet 16 is replaced by pallet 30. Parts that are the same as in FIG. 1 are given the same reference numerals and are not discussed again except as necessary for understanding the present embodiments. Pallet 30 comprises a central board 31, and surrounding flaps 32, 34 and 36.

Flaps 32, 34 and 36 move between open and closed positions. In the open positions a garment can be placed on board 31 below the flaps. The flaps may then close. The flaps do not press against the board 31 itself but are displaced outwardly from the board so that on closing they pull the garment towards their respective sides. Thus the garment may be automatically pulled tight over the board as the flaps close downwardly over the overlapping fabric.

Figure 3:
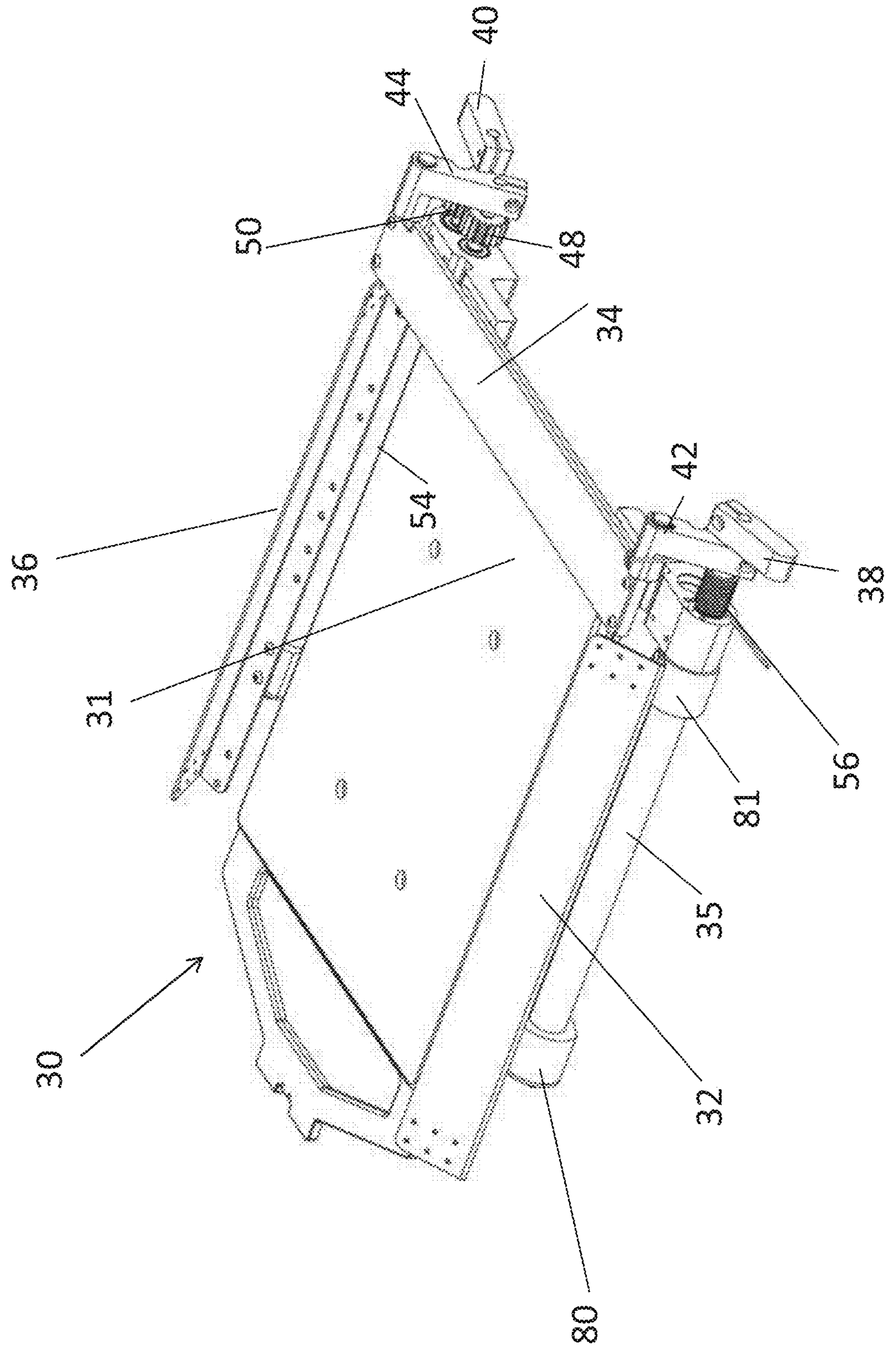
FIG. 3 is a simplified schematic diagram showing the pallet of FIG. 2 with open flaps.

Reference is now made to FIG. 3 which shows the platen 30 of FIG. 2 in greater detail, again with the flaps 32-36 in the open position. Levers 38 and 40 are connected to a series of gear wheels and rollers. The levers may operate to raise and lower the flaps 32-36. As lever 38 moves in or lever 40 moves outwards, axles 35 or 54 rotate to raise flaps 32 and 36. Flap 34 then transmits rotation to the other axle. For the reverse motion, axle 35 is rotated anti-clockwise to close flap 32 which is mounted thereon. Axle 54 likewise rotates in reverse to close flap 36 and flap 34 closes in either case. The reverse motion is governed by gear wheels 48 and 50.

The levers 38 and 40 engage rollers (See roller 85 in FIGS. 8 and 9) at the loading unloading position to automatically open the flaps for setting the garment. Restoring spring 56 pushes the lever back so that the flaps are reset as the pallet leaves the loading unloading station and disengages with the roller.

In greater detail, the machine moves the pallet between the printing area 12 and the loading or unloading station 14. As a result, one of the levers 38 or 40, hits roller 85—see FIGS. 8 and 9. The roller is fixed to the machine, say via bracket 87. The engagement turns one or other of the levers 38 or 40 that is connected to the axle, and either of axles 35 or 54 rotates. Each one of the axles turns inside a fixed tube. Pivoted flap mounts 80 and 81 for flap 32 and 82 and 83 for flap 36, rotate with the respective axle 35, 54, around the fixed tube. The flaps 32 and 36 are respectively connected to the pivoted flap mounts 80, 81, 82, 83. When one of the axles rotates, depending on which lever is activated, the other axle rotates at the opposite direction so that the two flaps 32 and 36 open simultaneously. The rotary motion between the axles is transmitted through the center flap 34 which is connected to the pivoted rotatable elements 42 and 44.

As discussed, gear wheels 48 and 50 reverse the rotation to ensure that the flaps close when the palette leaves the loading and unloading area 14.

That is to say, spring 56 rotates axle 54 for closing the flaps after the machine moves away the pallet from the loading or unloading system and the lever is released from the roller.

Figure 4:
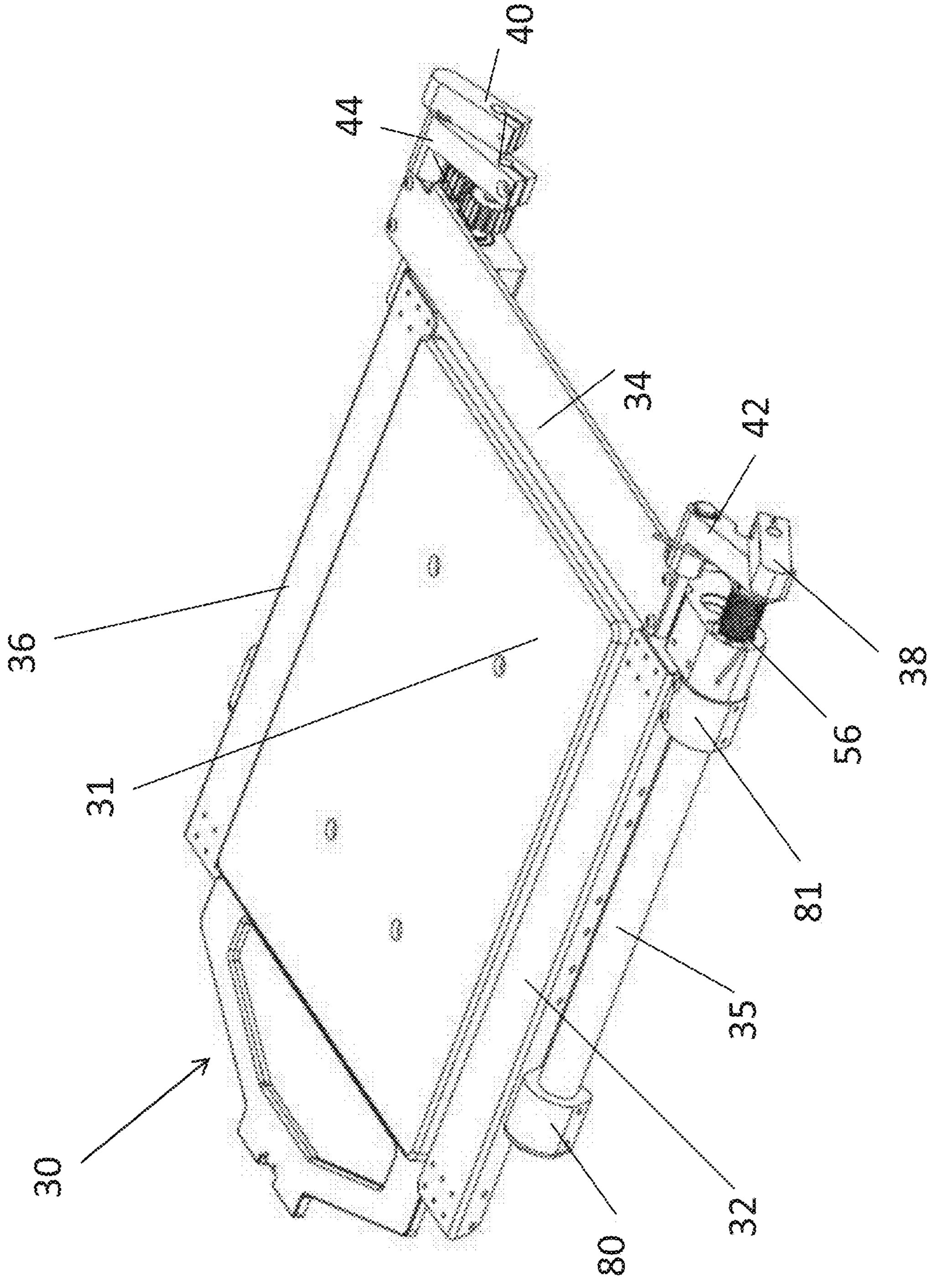
FIG. 4 is a simplified schematic diagram showing the pallet of FIG. 2 with closed flaps.

Reference is now made to FIG. 4, which shows the pallet with flaps closed. As the pallet travels away from the garment setting position to the printing area the axles ensure that the flaps 32, 34 and 36 are closed. Levers 38 and 40 move pivoted levers 42 and 44 to lower flap 34 and via rotation of axle 35 and the opposite axle to close flaps 32 and 34.

As discussed above, the flaps do not close against board 31. Rather they close outside board 31 leaving a narrow gap for the garment. Thus the closing of the frame does not rearrange the garment but rather holds it firmly in the position in which it has been placed by the operator.

FIG. 5 again shows the pallet with flaps open, from a lower angle, and showing second axle 54 on which flap 36 rotates. Spring 56 is a restoring spring which pushes the levers 38 and 40 back when the rollers are not present.

Figure 5:
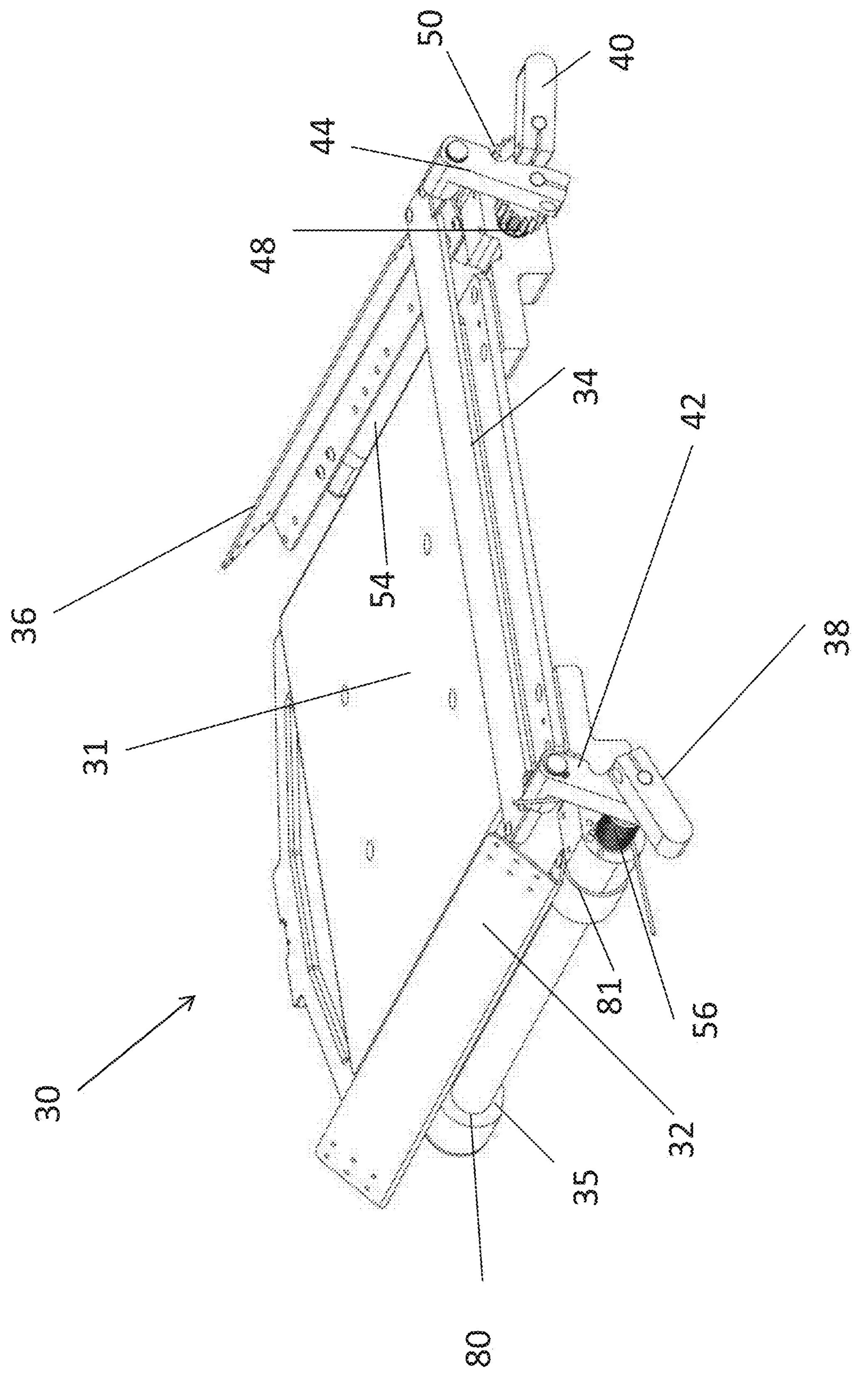
FIG. 5 is a simplified schematic diagram showing the pallet of FIG. 2 from a lower angle and with open flaps.
Figure 6:
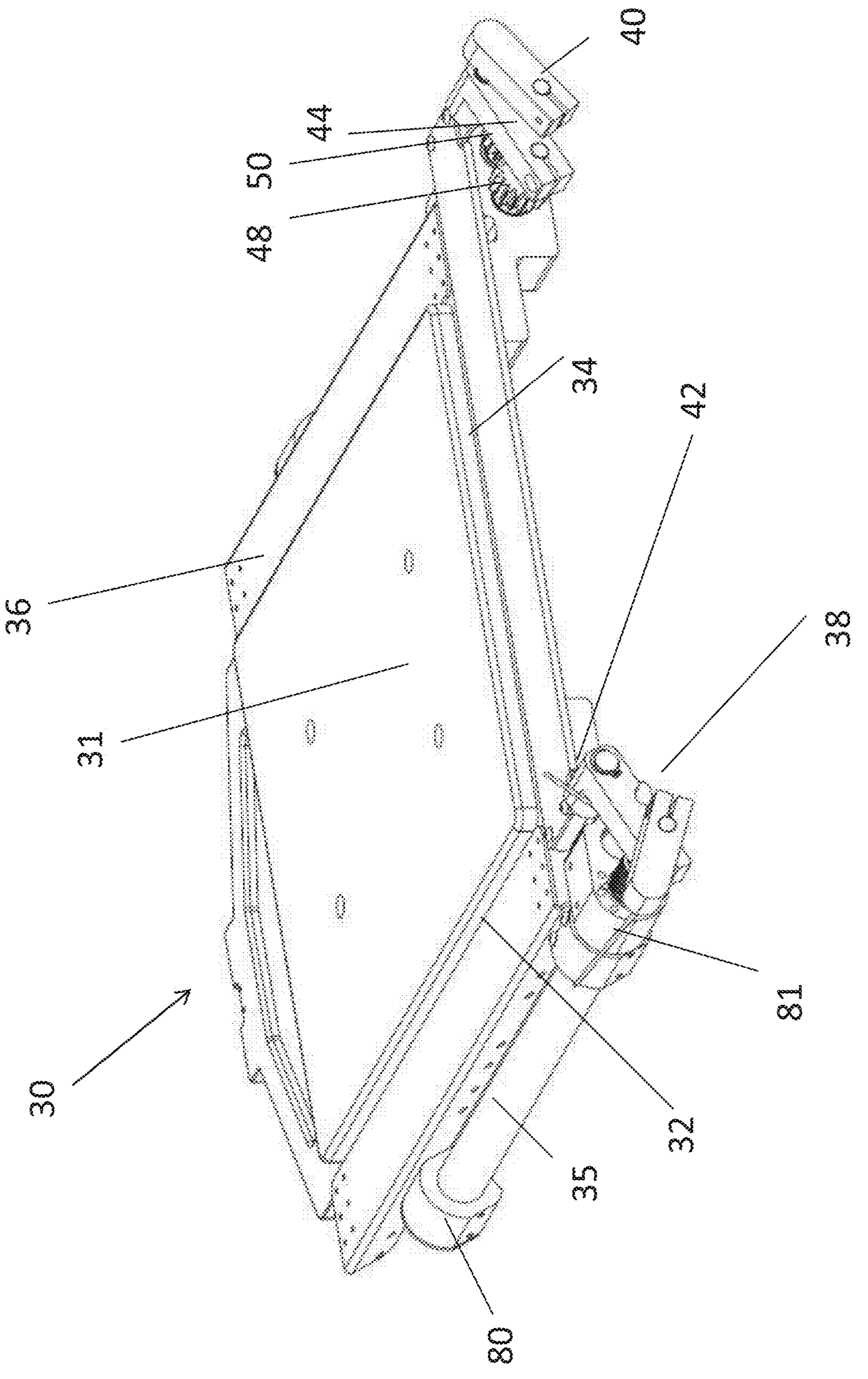
FIG. 6 is a simplified schematic diagram showing the pallet of FIG. 2 from a lower angle and with closed flaps.

FIG. 6 is a view of the pallet with flaps closed, shown from the angle of FIG. 5.

Figure 7:
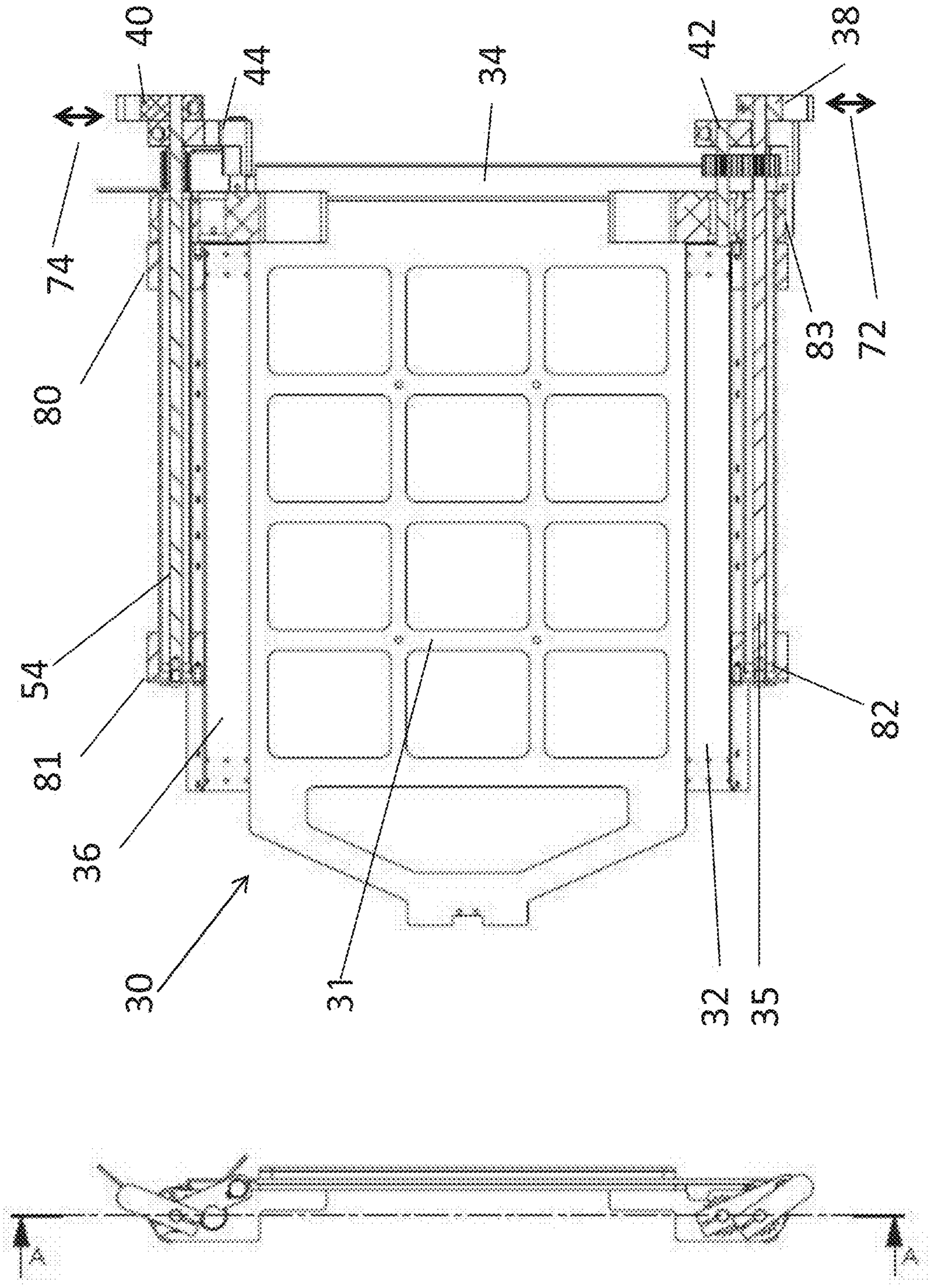
FIG. 7 is a simplified schematic cross section from above of the pallet of FIG. 2.

FIG. 7 is a simplified schematic diagram showing a cross section from above of the platen 30. Board 31 has flap 36 which is rotatable on axle 54. Flap 32 is rotatable on axle 35. Flap 34 is rotatable between pivoted rotatable elements 42 and 44 which can rotate flap 34 between a raised position and a lowered position in accordance with the positions of levers 38 and 40. The levers move in and out in the directions of arrows 72 and 74 depending on the position of the pallet.

Figure 8:
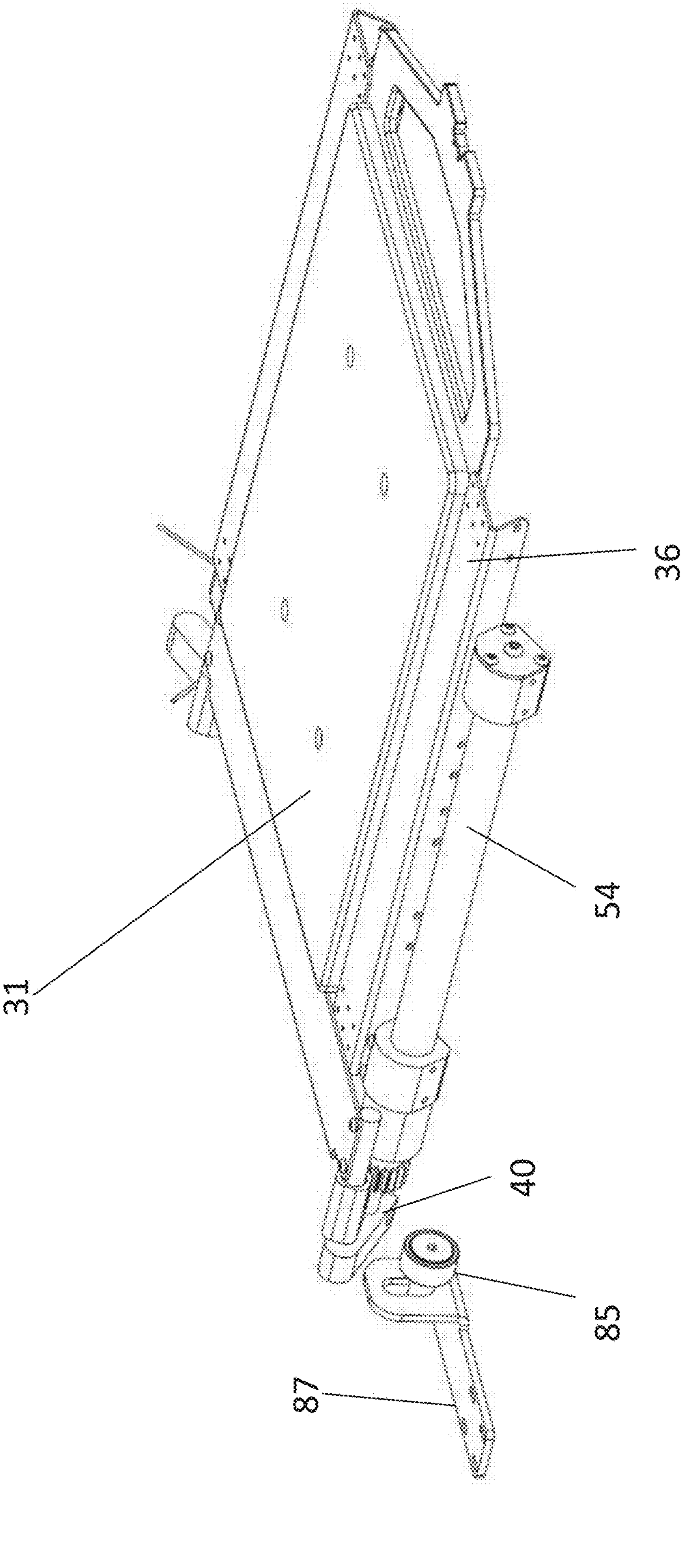
FIG. 8 is a simplified schematic diagram showing the pallet of FIG. 2 prior to engaging a roller at the garment setting position to raise the flaps.
Figure 9:
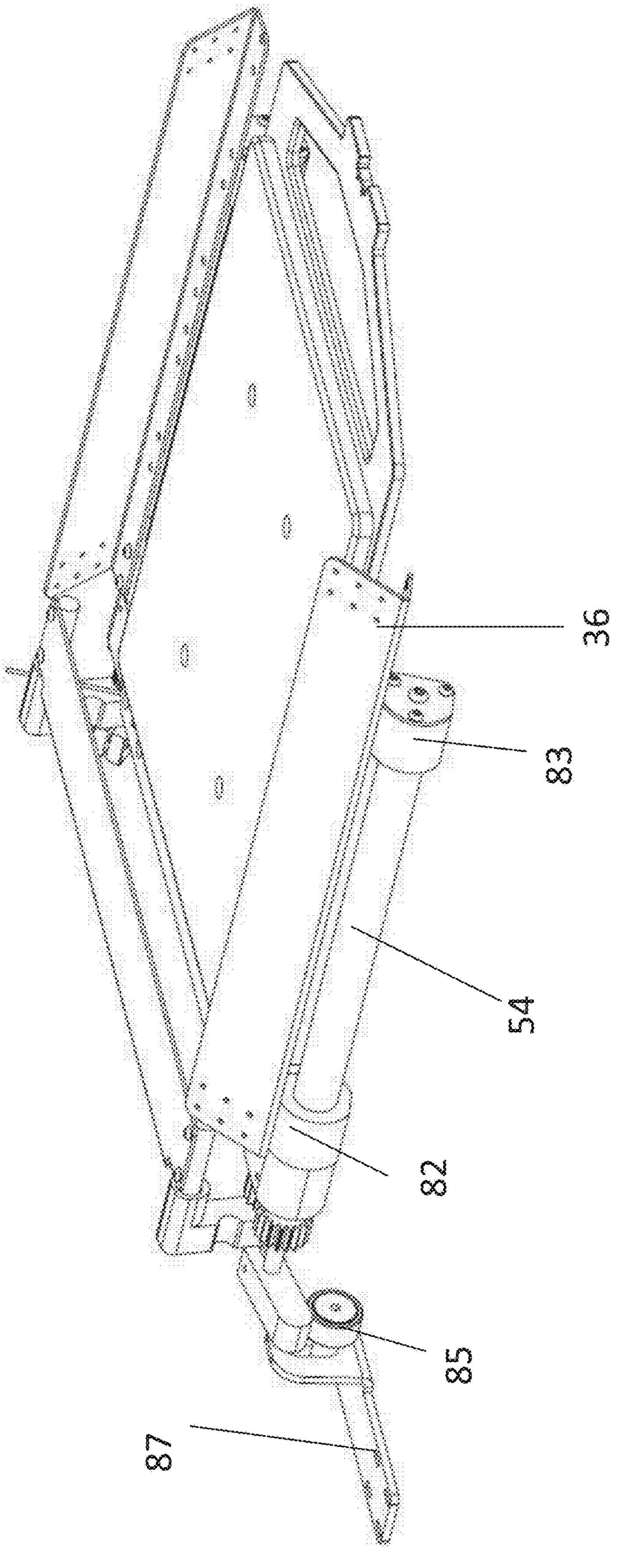
FIG. 9 shows the pallet of FIG. 8 upon engaging the roller.

Reference is now made to FIGS. 8 and 9 which show roller 85 that engages lever 40 to open and close the flaps, according to an embodiment of the present invention. It will be appreciated that there may be another lever on the opposite side. In FIG. 8 lever 80 has not yet been engaged as the pallet has not reached the garment setting position 14. In FIG. 9 lever 40 engages roller 85 and is lifted up, hence rotating axle 54 and thus raising flap 36.

As an alternative to roller 85, a cam may be provided to run the length of the pallet travel, and the levers 38 and 40 may act as cam followers.

In a further alternative, instead of flaps, the engagement mechanism of the present embodiments may automatically open and close a complete frame of the kind shown in FIG. 1.

The use of the present embodiments may improve the tautness of the garment as held by the pallet for printing. The level of automation of the garment loading process is increased, consequently improving throughput. The ergonomics of the loading and unloading process is improved and the risk of damage due to collision is reduced.

As the need to manually open the frame is avoided, unloading and loading operations may be immediately available as the pallet arrives at the garment setting position, otherwise referred to as the loading/unloading station. The frame arrives at the garment setting area with the flaps open and then enters the printing area with the flaps closed and the user is not expected to open or close any frame or flaps.

It is expected that during the life of a patent maturing from this application many relevant textile and garment printing devices and pallet-based loading systems will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for mounting a garment on a hold-down pallet and sending for printing on a textile printer, the method comprising:

placing the pallet at a garment setting position;

at said garment setting position placing the garment on a central board of the pallet;

closing side-flaps against opposing sides of the central board to hold the garment at sides of the garment against the board, wherein the side-flaps alternate between an open position to allow placing of the garment and a closed position to hold the garment firmly on the central board for printing, the closed position defining a gap between each side-flap and said central board, the gap being sufficiently narrow to tightly retain said garment, said closing of said side-flaps comprising rotating the side flaps from said open position to said closed position over edges of said garment to tighten said garment on said closing, and sending the hold-down pallet with the garment to a printing area for printing, wherein said side-flaps comprise at least two flaps on at least two sides of said central board, the method comprising at each side respectively opening one of said two flaps and closing one of said two flaps, and leaving at least one side of said central board open, said flaps not reaching said central board when in said closed position, leaving said gaps on respective ones of three sides of said central board between a closed side-flap inner end and said central board, and wherein said closing of said side-flaps comprises rotating said side-flaps downwardly from respective sides into an upper face of said central board so that oppositely facing flaps rotate in an opposite sense respectively, thereby to pull said garment tightly into a respective gap.

2. The method of claim 1 wherein the pallet travels between the garment setting position and the printing area, the method comprising closing said side-flaps prior to entering the printing area.

3. The method of claim 2, the method comprising placing said side-flaps in the open position when entering the garment setting position.

4. The method of claim 3, comprising rotating said side-flaps into said closed position by pivoting towards said central board.

5. The method of claim 1, comprising defining said gaps for the garment thickness of a garment for printing, thereby to hold said garment for printing firmly against said board.

* * * * *